United States Patent [19]
Byrne et al.

[11] Patent Number: 6,107,778
[45] Date of Patent: Aug. 22, 2000

[54] LINE-REPLACEABLE BATTERY DISCONNECT MODULE AND METHOD OF MANUFACTURE THEREOF

[75] Inventors: Vincent M. Byrne, Mesquite; Edward C. Fontana, Rockwall, both of Tex.

[73] Assignee: Lucent Technologies Inc., Murray Hill, N.J.

[21] Appl. No.: 08/937,845

[22] Filed: Sep. 25, 1997

[51] Int. Cl.[7] .................................. G02J 7/00; G02J 9/00
[52] U.S. Cl. ............................ 320/127; 307/64; 307/66
[58] Field of Search ................................... 320/127, 112, 320/107, 105; 429/121, 122, 123; 29/623.1; 307/66, 64, 67; 361/770, 771, 772, 773, 774, 775

[56] References Cited

U.S. PATENT DOCUMENTS

| | | | |
|---|---|---|---|
| 4,638,178 | 1/1987 | Kayser | 307/66 |
| 5,168,171 | 12/1992 | Tracewell | 307/64 |
| 5,567,991 | 10/1996 | Schantz et al. | 361/776 |
| 5,793,627 | 8/1998 | Caldes et al. | 307/64 |

*Primary Examiner*—Peter S. Wong
*Assistant Examiner*—K. Shin

[57] ABSTRACT

Battery backed-up power units, and battery disconnect modules and methods of manufacturing the same. One of the battery disconnect modules includes: (1) a contactor having a body, a control input and rigid conductors extending from the body and (2) a control circuit mount, connected to and supported by the rigid conductors, that contains control circuitry that controls the contactor by the control input, the rigid conductors connected to busbars within the battery backed-up power unit to provide a mount for the battery disconnect module and allow said control circuit to monitor a characteristic of a battery within the battery backed-up power unit and control the contactor in response thereto.

21 Claims, 5 Drawing Sheets

LINE-REPLACEABLE BATTERY DISCONNECT MODULE AND METHOD OF MANUFACTURE THEREOF

TECHNICAL FIELD OF THE INVENTION

The present invention is directed, in general, to battery backed-up power units and, more specifically, to a battery backed-up power unit having a battery disconnect module that is line-replaceable as a single unit and a method of manufacture therefor.

BACKGROUND OF THE INVENTION

Over the years, telecommunication systems have achieved a sterling reputation for reliability. One reason for that reputation is that, when other utilities (such as electricity and gas) are interrupted, one's telephone still works. This is due in part to the fact that wire-based telecommunications equipment is powered from a central location equipped with a battery backed-up power unit. The battery backed-up power unit supplies electricity to the equipment when external power is interrupted.

Commercially-available battery backed-up power units typically employ a plurality of batteries, not unlike the lead-acid batteries found in automobiles. The batteries are joined in series to form what is called a "string" of batteries. The strings are sometimes joined in parallel to provide adequate power reserve to the equipment.

By experience, it has been found highly undesirable to allow the batteries in the battery strings to discharge completely. When a battery of the type employed in such units is completely discharged, it becomes impossible to recharge, and the batteries must be discarded. This is both expensive and wasteful. It is far better to discharge a battery string only as far as possible without permanently damaging it and then to disconnect the battery string to prevent it from being discharged further. Accordingly, commercially-available battery backed-up power units frequently provide a low voltage disconnect ("LVD") that detects the output voltage of each battery string or group of parallel strings and, in response thereto, decouples battery strings as their voltage drops below a predetermined minimum level.

The LVD function is conventionally centralized and consists of two separate parts: one or more distributed contactors and central sense and control circuitry. Unfortunately, if a conventional, centralized LVD indicates a failure, it may be difficult to determine whether one of the distributed contactors or the central sense and control circuitry has failed. Given this, manufacturers of such battery backed-up power units have directed that both the distributed contactors and the central sense and control circuitry be replaced when a failure is indicated.

Frequently, however, operators in the field ignored the manufacturers' informed directions, replacing only one of either a contactor or the central control board. As a result, the operators replaced contactors when the fault was in the central control board or replaced the central control board when a contactor was at fault. Without both in working order, the LVD cannot operate properly, exposing at least one of the battery strings to destruction from excessive discharge or erroneously disconnecting one of the battery strings under normal battery voltages, introducing the possibility of loss of telecommunications services during power outages and associated liabilities and loss of revenue.

Accordingly, what is needed in the art is a more effective way of ensuring that a battery backed-up power unit does not lose its LVD function because of poor field maintenance practice.

SUMMARY OF THE INVENTION

To address the above-described deficiencies of the prior art, the present invention provides, for use with a battery backed-up power unit, a battery disconnect module, comprising: (1) a contactor having a body, a control input and rigid conductors extending from the body and (2) a control circuit mount, connected to and supported by the rigid conductors, that contains control circuitry that controls the contactor via the control input. The rigid conductor is connected (directly or indirectly) to busbars within the battery backed-up power unit to (1) provide a mount for the battery disconnecting module and (2) allow the control circuit to monitor a characteristic of the battery (or battery string, as the case may be) within the battery backed-up power unit and control the contactor in response thereto.

The present invention therefore introduces the broad concept of marrying the contactor and the control circuit into a single replaceable module to yield a fully self-contained LVD system. Because the contactor and the control circuit are joined into a module, operators in the field are forced to replace the contactor and the control circuit together. "Conductors" and "busbars," as the terms are used herein, are not limited to heavy-duty embodiments; Depending upon the desired current-handling capacity of a given LVD, the conductors and busbars may take the form of wires or even traces in a printed wiring board ("PWB"). "Battery," as used herein, includes a single battery, a battery string and parallel-coupled batteries and battery strings.

In one embodiment of the present invention, the contactor comprises an electromagnetic actuator spring-biased toward an opened state. In an embodiment to be illustrated and described, the contactor takes the form of a relay that is normally open. If, by some chance, power is disabled to the contactor, the battery coupled to the contactor is decoupled from the remainder of the battery backed-up power unit, thereby preserving the battery as against excessive discharge.

In one embodiment of the present invention, the control circuit comprises a circuit board having apertures that receive the rigid conductors therethrough. Alternatively, the control circuit mount may be joined to the contactor by any other means that results in a unitary battery disconnect module.

In one embodiment of the present invention, the contactor is mounted directly to a PWB on which the control circuit is mounted. In such case, both power and signal/control connections may be made to the PWB. This connection may be effected by, for example, ribbon or discrete wiring, separable connector, or card edge connector. Further, since the conductors are integral with the PWB and since the PWB mechanically supports the contactor, the conductors support the contactor.

In one embodiment of the present invention, the contactor further has a status output that allows the control circuitry to monitor a status of the contactor. In the embodiment to be illustrated and described, the contactor has an integral circuit for determining its state. The control circuitry is advantageously coupled to the circuit to allow it to determine the state of the contactor independently.

In one embodiment of the present invention, the control circuitry monitors an output voltage of the battery. Alternatively, or additionally, the control circuitry could monitor an output current of the battery or a temperature of the battery.

In one embodiment of the present invention, the control circuitry includes a cable for coupling the control circuitry to an alert circuit, the control circuit providing a signal indicating the status of the contactor. In the embodiment illustrated and described, the cable comprises a ribbon cable and the alert circuit comprises one or more light-emitting diodes ("LEDs"). The control circuitry drives the alert circuit to provide an external indication of at least the status of the contactor, thereby allowing an external inspection of such status.

In one embodiment of the present invention, the module further comprises an insulator at least partially surrounding the control circuit mount. The insulator, while not necessary to the present invention, enhances the chances for safe removal and reinsertion of the module by operators in the field.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
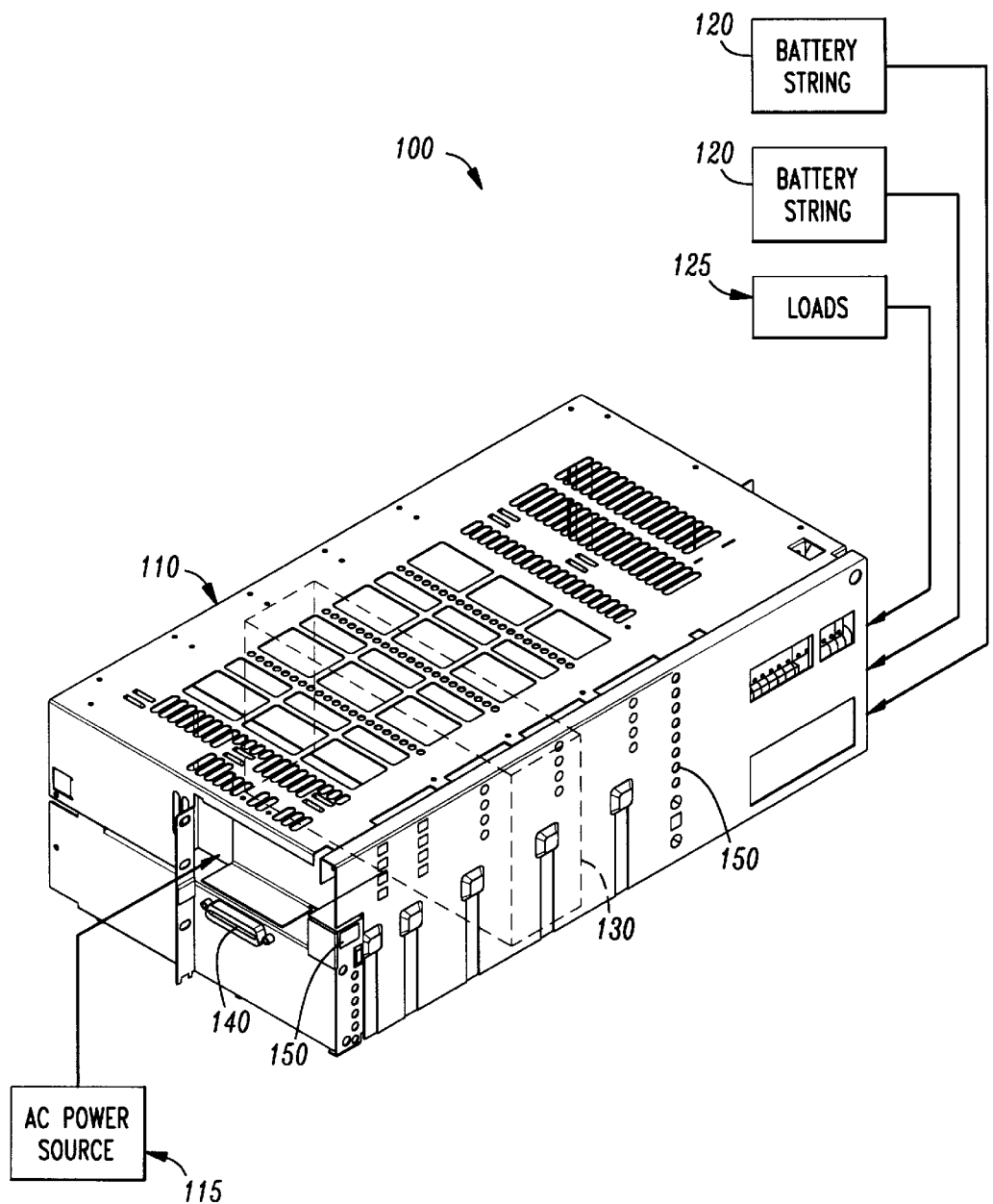
FIG. 1 illustrates a schematic isometric view of a rectifier-ringer plant embodied in a battery backed-up power unit that provides an environment within which the battery disconnect module of the present invention can operate.

Referring initially to FIG. 1, illustrated is a schematic isometric view of a rectifier-ringer plant embodied in a battery backed-up power unit that provides an environment within which the battery disconnect module of the present invention can operate. The battery backed-up power unit, generally designated 100, comprises a cabinet 110 coupled to an AC power source 115 and a plurality of battery strings 120. The cabinet 110 contains a plurality of chassis 130 (shown in phantom line), some of which may contain ringers, rectifiers, converters or inverters.

A battery disconnect module (not shown) also resides in the cabinet 110. The battery disconnect modules couple the battery strings 120 to output circuitry (not shown) of the battery backed-up power unit 100. The output circuitry terminates at an output distribution section (not shown) of the battery backed-up power unit 100, allowing fuses or circuit breakers (not shown) to be added and loads 125 to be coupled thereto. Signal-level communication between the various chassis 130 and the battery disconnect module (not shown) may be accomplished by means of a data bus (not shown). Plant operational and alarm status may be monitored by external equipment via an office alarm connector 140. Finally, alert circuitry 150, including a display, allows the battery backed-up power unit to convey information concerning its operation to an operator in the field.

Figure 2:
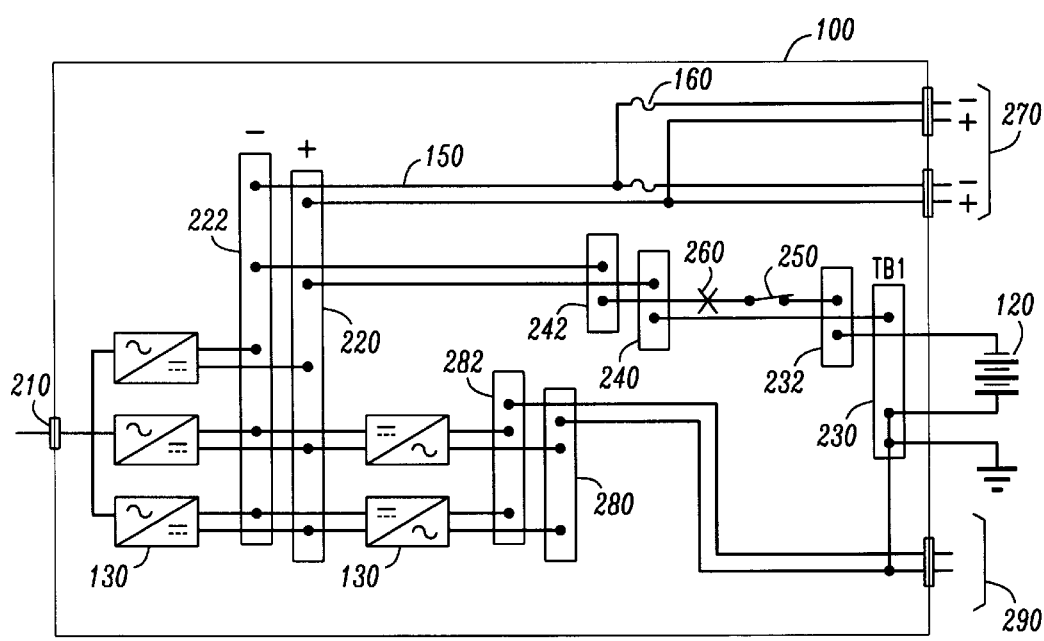
FIG. 2 illustrates a functional schematic of the battery backed-up power unit of FIG. 1.

Turning now to FIG. 2, illustrated is a functional schematic of the battery backed-up power unit 100 of FIG. 1. In addition to those elements called out with respect to the above description of FIG. 1, the battery backed-up power unit 100 comprises an AC power source 210, a plurality of rectifiers (residing within ones of the plurality of chassis 130 of FIG. 1). The rectifiers deliver power to primary output bus conductors 220, 222 A representative battery string 120 is coupled via conductors 230, 232, an optional manual switch 250 and a battery disconnect module 260 to busbars 240, 242. The battery string 120 may be disconnected from the busbar 242, thereby opening the battery circuit, either manually, by opening the optional manual switch 250, or automatically by means of the battery disconnect module 260, operating as part of a self-contained LVD constructed according to the principles of the present invention.

One or more loads 270 (which may be telecommunications equipment) may be coupled via fuses or breakers to the primary output bus conductors 220, 222. Finally, a plurality of ringers (contained within some of the chassis 130) generate ringing signals for the telephones and are coupled to a ring output 290 of the battery backed-up power unit 100 via ring busbar conductors 280, 282.

Figure 3:
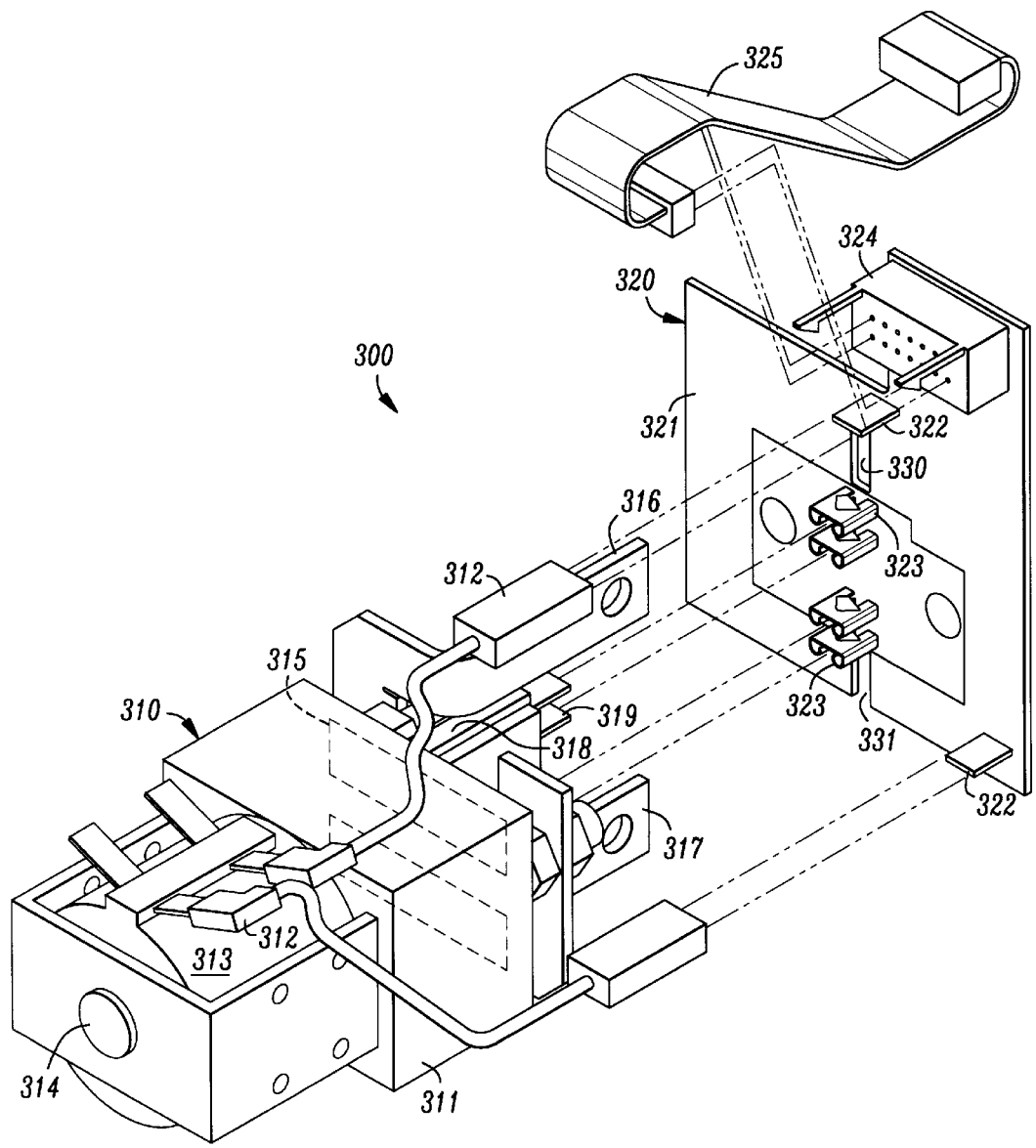
FIG. 3 illustrates a partially exploded isometric view of one embodiment of the battery disconnect module constructed according to the present invention.

Turning now to FIG. 3, illustrated is an isometric view of a battery disconnect module 300 constructed according to the present invention. The battery disconnect module 300 comprises a contactor 310 having a contactor body 311, a control input 312, an electromagnetic coil 313, an actuator 314 and, shown in phantom line, a plurality of individual electrical contacts, collectively referenced as 315.

Rigid conductors 316, 317 extend from the contactor body 311, conducting electrical power into and out of the contactor 310 and, in the illustrated embodiment, providing a mount for the battery disconnect module 300. Alternatively, the conductors 316, 317 may is be flexible, but, if so, other means may be required to provide a mount for the battery disconnect module 300. In the illustrated embodiment, the electrical contacts 315 and the rigid conductors 316, 317 are sized to handle about 100 amperes of DC power, although embodiments directed to handling more or less power are well within the broad scope of the present invention.

The contactor 310 further has a status output 319, illustrated as being in the form of a plurality of blades. The status output 319 allows a status of the contactor 310 to be determined directly. When the contactor 310 is closed and electrical current is allowed to flow between the rigid conductors 316, 317, the status output 319 changes from a "normal" state, providing both a contact closure and a contact opening (in the illustrated embodiment, this is accomplished by embodying the status indicator 319 in a separate switch 318 and extending the actuator 314 to allow it to activate the relay 318 when the contactor 310 is closed). Conversely, when the contactor 310 is opened and the rigid conductors 316, 317 are electrically decoupled from one another, the status output 319 returns to the "normal" state (in the illustrated embodiment, by means of retracting the actuator 314).

FIG. 3 also shows control circuitry 320 comprising a control circuit mount 321, taking the form of a circuit board in this embodiment. The control circuit mount 321 provides a physical mount for the control circuitry and allows the control circuitry to be rigidly affixed to the contactor 310. Mounting of the control circuit mount 321 to the contactor 310 is achieved in the illustrated embodiment by passing the rigid conductors 316, 317 through corresponding and appropriately-registered apertures 330, 331. This allows the rigid conductors 316, 317 to serve as an overall mechanical support for the battery disconnect module 300 as a whole, including the contactor 310 and the control circuitry 320. Further, because the contactor 310 and the control circuitry 320 are so joined, they are removable or insertable only as a single unit or module, thereby avoiding the above-described deficiencies of the prior art.

The control circuit mount 321 comprises a pair of blades 322 for controlling the contactor 310 via the control input 312. The control circuit mount 321 further comprises a plurality of female contacts 323 situated to be coupled to the blades of the status output 319 of the contactor 310 to allow status monitoring thereof. The control circuitry is adapted to measure an output voltage of an associated battery string (120 of FIG. 2). If the voltage of the battery drops below a certain predetermined threshold, the control circuitry sends a signal via the control input 312 to the contactor 310, commanding the contactor 310 to decouple the battery from the remainder of the battery backed-up power unit (100 of FIG. 1). The control circuitry may also monitor the status of the contactor 310 via the status output 319 to determine whether the contactor 310 has, in fact, acted as commanded.

The control circuit mount 321 further is provided with a socket 324 adapted to receive a cable 325 thereon. The cable 325 is coupled to an alert circuit that enables the control circuitry to give an indication of the status of the contactor 310, among other things. The alert circuit may be an LED or other visual or auditory indicator.

Figure 4:
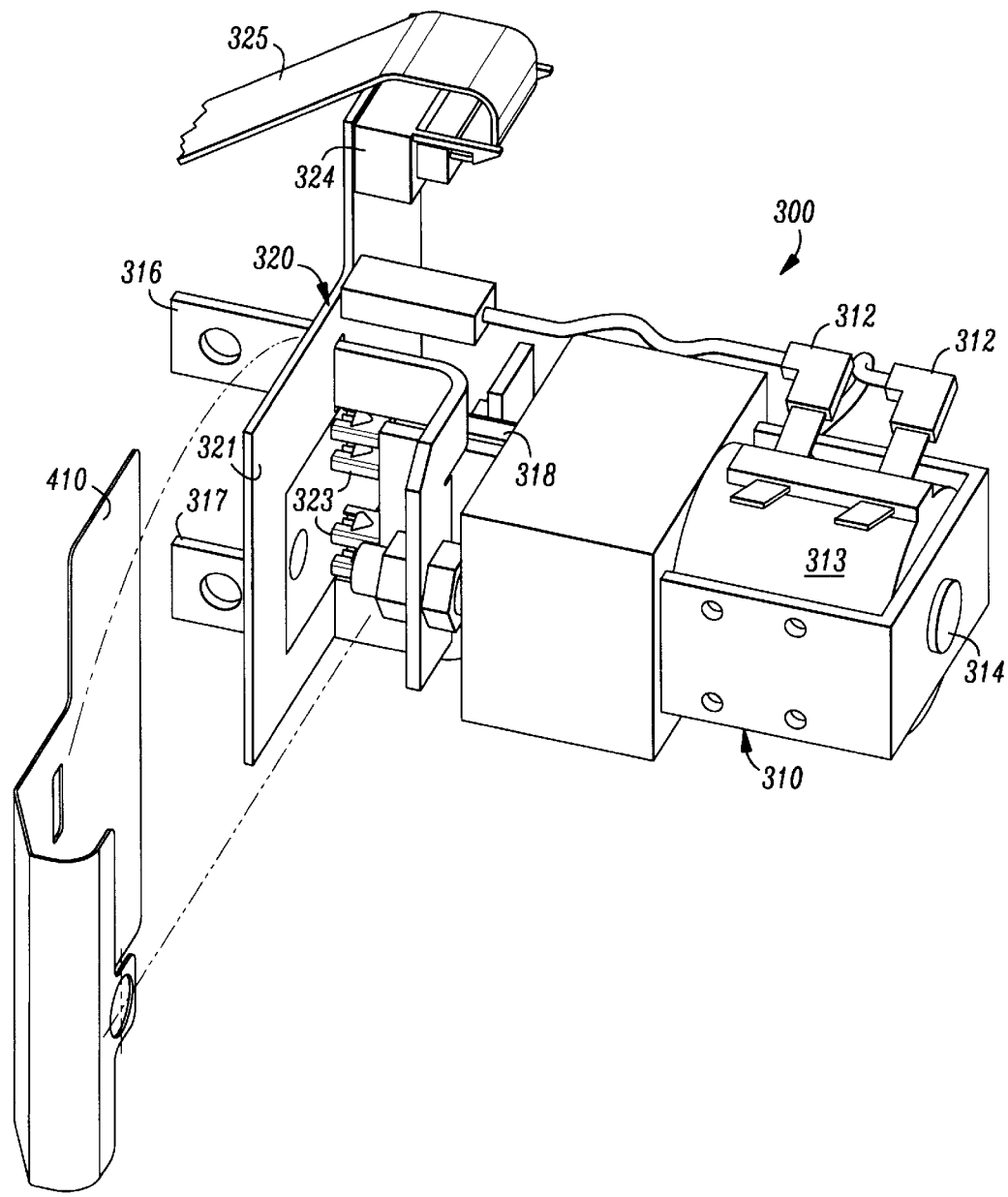
FIG. 4 illustrates a reverse-angle, partially exploded isometric view of the battery disconnect module of FIG. 3.

Turning now to FIG. 4, illustrated is a reverse angle, partially-exploded isometric view of the battery disconnect module of FIG. 3. FIG. 4 is provided with a purpose of illustrating the addition of an insulator 410. The insulator 410 wraps about and thereby at least partially surrounds the control circuit mount 321, thereby rendering the battery disconnect module 300 safer to remove or to insert into the battery backed-up power unit 100 of FIG. 1.

Figure 5:
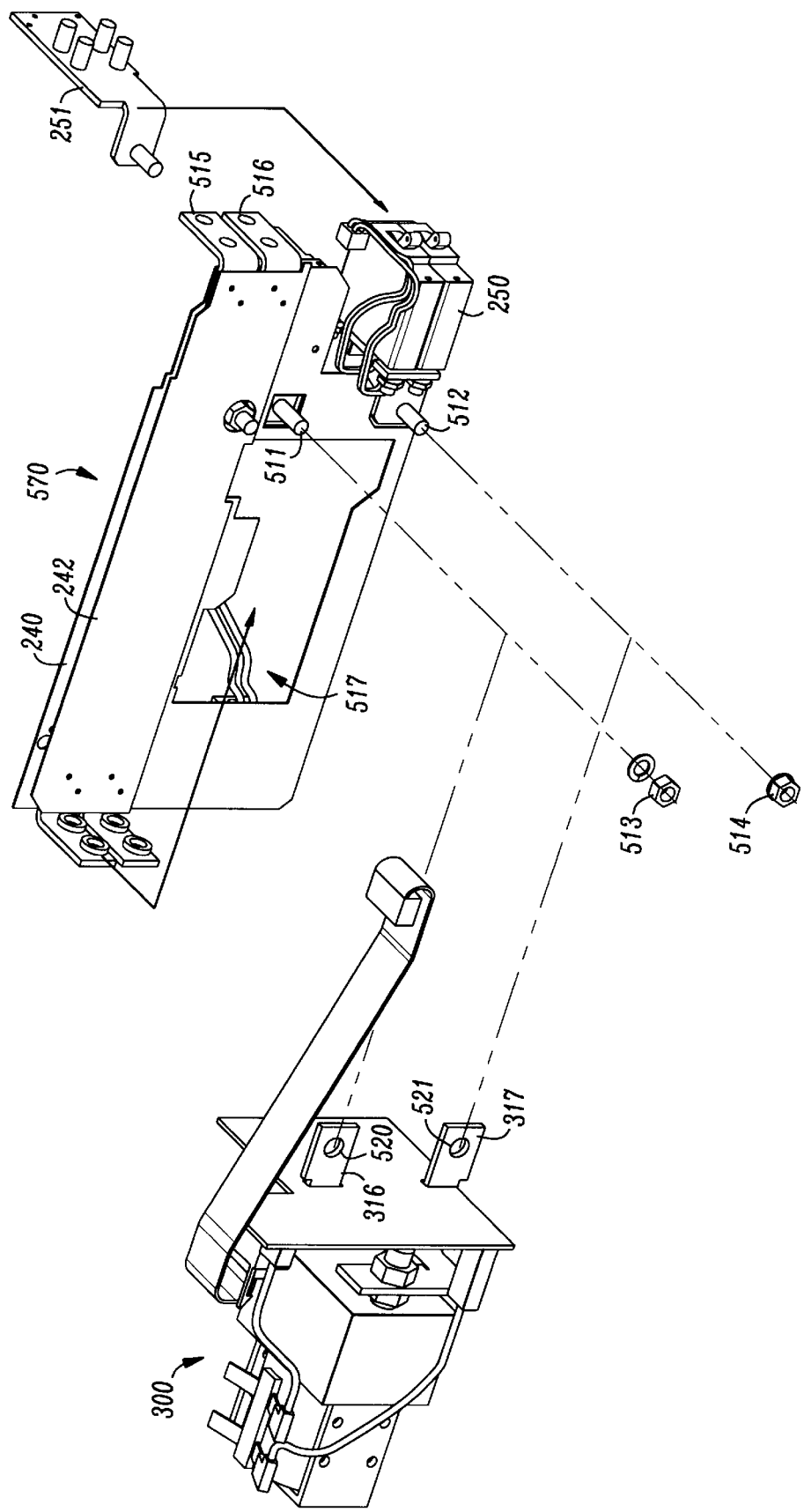
FIG. 5 illustrates a partially exploded isometric view of the battery backup module of FIGS. 3 and 4 and a busbar assembly that may be mated thereto.

Turning now to FIG. 5, illustrated is a partially exploded isometric view of the battery backup module 300 of FIGS. 3 and 4 and a busbar assembly that may be mated thereto. The busbar assembly, generally referenced as 510, comprises busbars 240, 242 that terminate in output straps 515, 516 that may be coupled to a load (not shown, but which may be, for example, the load 270 of FIG. 2).

FIG. 5 also illustrates a pair of optional manual switches 250 that may be toggled to disconnect the battery (not shown) from the load (not shown). If a user elects not to use the optional manual switches 250, the manual switches 250 are replaced with a battery lead termination busbar 251.

A pair of (perhaps threaded) posts 511, 512 are located to register with holes 520, 521 in the rigid conductors 316, 317, respectively. Nuts 513, 514 may be used to secure the rigid conductors 316, 317 onto the posts 511, 512. This provides electrical coupling and mechanical support for the entire battery disconnect module 300. It is apparent in FIG. 5 that the battery disconnect module 300 sits within a module aperture 517 formed in the busbars 240, 242 when mounted.

The embodiments illustrated and described above are directed to relatively high-current applications. As previously discussed, the present invention also encompasses lower-current embodiments wherein conductors and busbars take the form of wires or traces in or on PWBs. In such embodiments, conductors and busbars may be coupled in ways more appropriate to lower currents, such as through use of sockets or soldering.

From the above, it is apparent that the present invention provides, for use with a battery backed-up power unit, a battery disconnect module, comprising: (1) a contactor having a body, a control input and rigid conductors extending from the body and (2) a control circuit mount, connected to and supported by the rigid conductors, that contains control circuitry that controls the contactor via the control input, the rigid conductor is connected to busbars within the battery backed-up power unit to provide a mount for the battery disconnect module and allow the control circuit to monitor a characteristic of a battery within the battery backed-up power unit and control the contactor in response thereto.

Although the present invention has been described in detail, those skilled in the art should understand that they can make various changes, substitutions and alterations herein without departing from the spirit and scope of the invention in its broadest form.

What is claimed is:

1. A battery backed-up power unit, comprising:
   a cabinet;
   a plurality of batteries located within said cabinet;
   a busbar couplable to said batteries that conduct electricity from said batteries to an electrical load;
   a plurality of line-replaceable battery disconnect modules that switchably couple corresponding ones of said plurality of batteries to said busbar, each of which modules including:
      a contactor having a body, a control input and rigid conductors extending from said body, and
      a control circuit mount, connected to and supported by said rigid conductors, that contains control circuitry that controls said contactor via said control input, said rigid conductors connected to said busbar to provide a mount for said battery disconnect module and allow said control circuit to monitor a characteristic of said corresponding one of said plurality of batteries and control said contactor in response thereto; and
   a plurality of alert circuits, coupled to said plurality of modules, that display a status of corresponding contactors.

2. The battery backed-up power unit as recited in claim 1 wherein said contactor comprises an electromagnetic actuator spring-biased toward an open state.

3. The battery backed-up power unit as recited in claim 1 wherein said control circuit mount comprises a circuit board having apertures that receive said rigid conductors therethrough.

4. The battery backed-up power unit as recited in claim 1 wherein said contactor further has a status output that allows said control circuitry to monitor a status of said contactor.

5. The battery backed-up power unit as recited in claim 1 wherein said control circuitry monitors an output voltage of said corresponding one of said plurality of batteries.

6. The battery backed-up power unit as recited in claim 1 wherein said control circuitry includes a cable for coupling said control circuitry to said alert circuit.

7. The battery backed-up power unit as recited in claim 1 wherein said module further includes an insulator at least partially surrounding said control circuit mount.

8. For use with a battery backed-up power unit, a battery disconnect module, comprising:

a contactor having a body, a control input and rigid conductors extending from said body; and a control circuit mount, connected to and supported by said rigid conductors, that contains control circuitry that controls said contactor via said control input, said rigid conductors connected to busbars within said battery backed-up power unit to provide a mount for said battery disconnect module and allow said control circuit to monitor a characteristic of a battery within said battery backed-up power unit and control said contactor in response thereto.

9. The module as recited in claim 8 wherein said contactor comprises an electromagnetic actuator spring-biased toward an open state.

10. The module as recited in claim 8 wherein said control circuit mount comprises a circuit board having apertures that receive said rigid conductors therethrough.

11. The module as recited in claim 8 wherein said contactor further has a status output that allows said control circuitry to monitor a status of said contactor.

12. The module as recited in claim 8 wherein said control circuitry monitors an output voltage of said battery.

13. The module as recited in claim 8 wherein said control circuitry includes a cable for coupling said control circuitry to an alert circuit, said control circuit providing a signal indicating a status of said contactor to said alert circuit.

14. The module as recited in claim 8 further comprising an insulator at least partially surrounding said control circuit mount.

15. A method of manufacturing a battery disconnect module, comprising the steps of:

forming a contactor having a body, a control input and rigid conductors extending from said body; and mounting a control circuit mount on said rigid conductors, said control circuit mount containing control circuitry that controls said contactor via said control input, said rigid conductors connectable to busbars within said battery backed-up power unit to provide a mount for said battery disconnect module and allow said control circuit to monitor a characteristic of a battery within said battery backed-up power unit and control said contactor in response thereto.

16. The method as recited in claim 15 wherein said step of forming comprises the steps of:

providing an electromagnetic actuator; and spring-biasing said actuator toward an open state.

17. The method as recited in claim 15 wherein said control circuit mount comprises a circuit board, said step of mounting comprising the steps of:

creating apertures in said circuit board; and inserting said rigid conductors through said apertures.

18. The method as recited in claim 15 wherein said contactor further has a status output, said method further comprising the step of coupling said control circuitry to said status output.

19. The method as recited in claim 15 wherein said control circuitry is adapted to monitor an output voltage of said battery.

20. The method as recited in claim 15 further comprising the step of coupling a cable to said control circuitry, said cable allowing said control circuitry to be coupled to an alert circuit, said control circuit providing a signal indicating a status of said contactor to said alert circuit.

21. The method as recited in claim 15 further comprising the step of at least partially surrounding said control circuit mount with an insulator.

* * * * *